United States Patent
Wang

(10) Patent No.: US 10,866,564 B2
(45) Date of Patent: Dec. 15, 2020

(54) FULL-FUNCTION HOLOGRAPHIC ANTENNA AND METHOD FOR FABRICATING SAME

(71) Applicant: HON HAI PRECISION INDUSTRY CO., LTD., New Taipei (TW)

(72) Inventor: Li-Tsun Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/459,892

(22) Filed: Jul. 2, 2019

(65) Prior Publication Data
US 2020/0319594 A1   Oct. 8, 2020

(30) Foreign Application Priority Data
Apr. 2, 2019   (CN) .......................... 2019 1 0259599

(51) Int. Cl.
| | | |
|---|---|---|
| G03H 5/00 | (2006.01) | |
| H01Q 19/02 | (2006.01) | |
| G03H 1/04 | (2006.01) | |
| H01Q 13/02 | (2006.01) | |
| H01Q 19/06 | (2006.01) | |
| H01Q 19/10 | (2006.01) | |

(52) U.S. Cl.
CPC ............ *G03H 5/00* (2013.01); *G03H 1/0443* (2013.01); *H01Q 13/0283* (2013.01); *H01Q 19/02* (2013.01); *H01Q 19/067* (2013.01); *H01Q 19/108* (2013.01)

(58) Field of Classification Search
CPC .. H01Q 19/067; H01Q 19/08; H01Q 13/0283; H01Q 19/02; G03H 5/00; G03H 1/0443
USPC .......................................................... 343/772
See application file for complete search history.

(56) References Cited

U.S. PATENT DOCUMENTS

| | | | | |
|---|---|---|---|---|
| 3,945,825 | A * | 3/1976 | Gale ...................... | G03F 7/001 430/1 |
| 4,555,622 | A * | 11/1985 | Glass .................... | H01L 31/103 136/255 |
| 5,757,521 | A * | 5/1998 | Walters .............. | G06K 19/0672 235/380 |
| 5,757,523 | A * | 5/1998 | Wood ....................... | G02B 5/32 359/15 |
| 10,530,054 | B2 * | 1/2020 | Urzhumov ............. | H01Q 19/08 |
| 2010/0207803 | A1 * | 8/2010 | McMakin ................ | H01Q 1/38 342/22 |
| 2011/0157599 | A1 * | 6/2011 | Weaver .................. | G01N 21/45 356/496 |
| 2014/0117260 | A1 * | 5/2014 | Woida-O'Brien ... | G03H 1/0891 250/503.1 |

* cited by examiner

*Primary Examiner* — Hai V Tran
(74) *Attorney, Agent, or Firm* — ScienBiziP, P.C.

(57) ABSTRACT

A holographic antenna for recording a comprehensive interference pattern beyond the mere minimum and maximum values and reconstructing waveform of a target antenna includes a feed antenna and a holographic structure. The holographic structure includes a substrate and a plurality of spaced metal strips disposed on the substrate. Heights of the metal strips are negatively correlated with intensities of the interference pattern. A method for fabricating such a holographic antenna is also provided.

14 Claims, 5 Drawing Sheets

US 10,866,564 B2

FULL-FUNCTION HOLOGRAPHIC ANTENNA AND METHOD FOR FABRICATING SAME

FIELD

The subject matter herein generally relates to antennas.

BACKGROUND

A holographic antenna generates an interference field by radiating waves from feed antennas and target antennas, and records the interference field intensities on a substrate using a holographic structure to create a hologram pattern. Surface waves can be emitted via the feed antenna to excite the hologram pattern and reconstruct the waves from the target antenna.

A holographic structure generally refers to a metal strip similar in structure to the interference field. The holographic structure can only record the portions of the interference field with minimum intensities, that is, the holographic structure only records strips which are generating when a phase of the radiation waves from the source antenna is exactly one half of a wavelength before or after the phase of the waves from the target antenna. Other portions of the interference field are not recorded by the holographic structure. Therefore, the interference field recorded by the holographic structure does not reflect the actual interference field and may have phase errors which distort the reconstructed waveform. Performance of such holographic antenna is thus reduced.

Therefore, there is room for improvement.

BRIEF DESCRIPTION OF THE DRAWINGS

Implementations of the present technology will now be described, by way of embodiments, with reference to the attached figures.

DETAILED DESCRIPTION

The present disclosure is made in conjunction with the accompanying drawings. Specific embodiments of the present disclosure are described.

In the following description, when an element is described as being "fixed to" another element, the element can be fixed to another element with or without intermediate elements. When an element is described as "connecting" another element, the element can be connected to the other element with or without intermediate elements. The terms "vertical", "horizontal" and similar expressions used herein are for illustrative purposes only.

Without a given definition otherwise, all terms used have the same meaning as commonly understood by those skilled in the art.

1. Technical Principle

Two waves interfering with each other can produce a hologram pattern and one of the waves can be reproduced when the hologram pattern is irradiated by another wave. In applications, the two waves can correspond to respective fields of a feed antenna and a target antenna. A holographic structure corresponding to the hologram pattern is provided. When the radiation of the feed antenna irradiates the holographic structure, the radiation field of the target antenna is reproduced. An antenna composed of such a feed antenna and such a holographic structure is a holographic antenna.

The feed antenna is a source of excitation of the holographic antenna. The feed antenna must uniformly irradiate the holographic structure in an E plane (the E plane being parallel to the direction of the electric field), and provide narrow beams in an H plane (the H plane being parallel to the direction of the magnetic field).

The holographic structure is a diffuser for the holographic antenna. The holographic structure must be able to simulate the interference field of the fields radiated by the feed antenna and the target antenna. In the microwave band, the interference field can only be recorded discretely, that is, point by point.

To better simulate the interference field of the waves radiated by the feed antenna and the target antenna, the present disclosure records intensities of interference strips using grayscale values of 0~255, and then establishes a holographic structure conforming to the actual interference field. For example, the lowest intensity of interference (i.e., the grayscale value is 0) is set as the highest point of the holographic structure, and the strongest intensity of interference (i.e., the grayscale value is 255) is set as the lowest point of the holographic structure. The grayscale values between 0 and 255 correspond to points of the holographic structure having heights between the highest point and the lowest point. An ideal shape of the holographic structure is produced according to the recorded grayscale values, thereby reducing the phase errors and improving the antenna signal quality.

2. Technical Solutions

Figure 1:
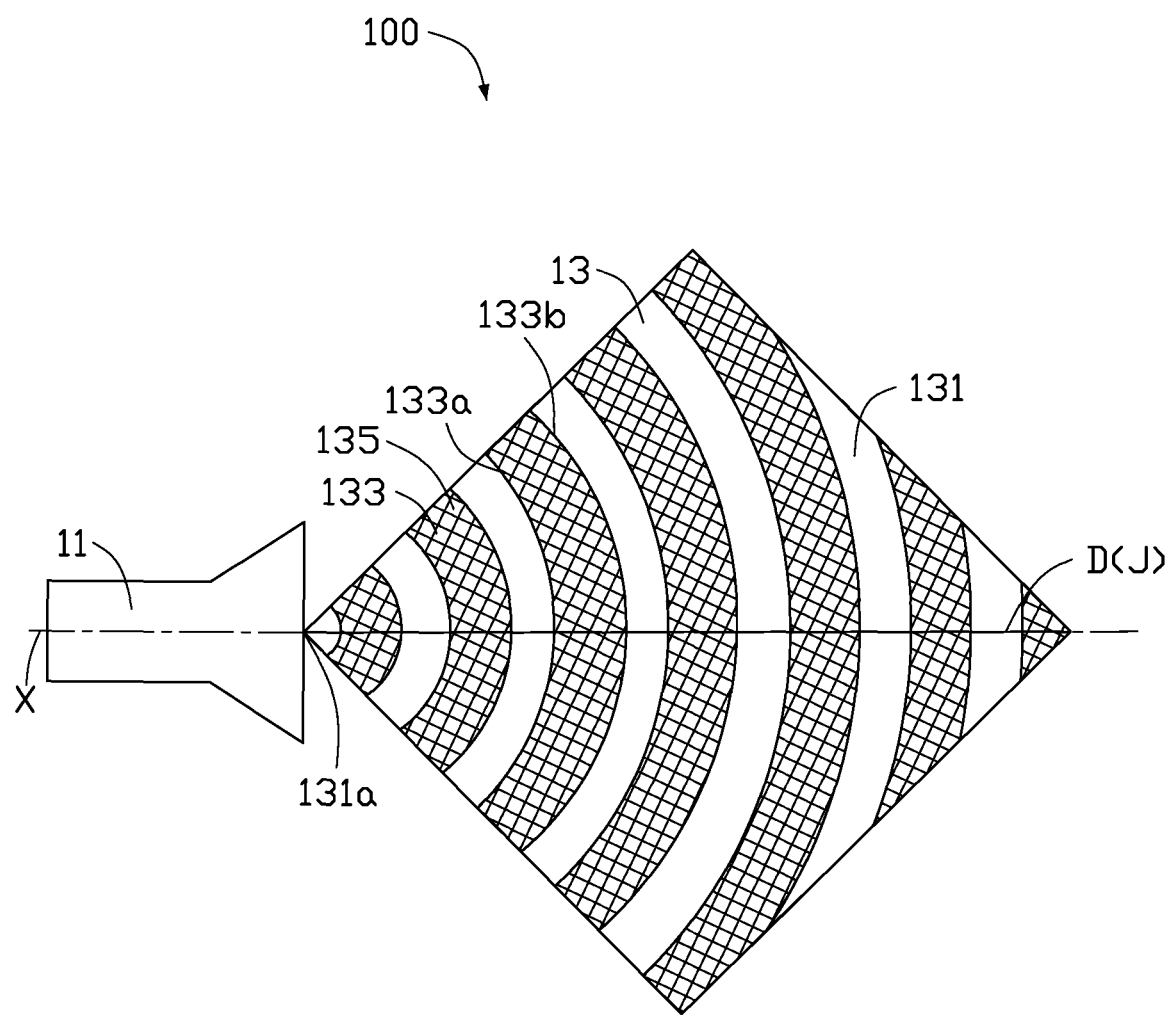
FIG. 1 is a schematic view of a holographic antenna according to an embodiment of the present disclosure.

Referring to FIG. 1, a holographic antenna 100 is configured to record an interference pattern (not shown) and reconstruct waveforms of a target antenna (not shown). The holographic antenna 100 includes a feed antenna 11 and a holographic structure 13. The holographic structure 13 includes a substrate 131 and a plurality of spaced metal strips 133 disposed on the substrate 131. The metal strips 133 are distributed on the substrate 131 according to an interference intensity distribution of the interference pattern and heights of portions of each of the metal strips 133 are negatively correlated with interference intensities T of the interference pattern. Portions of a metal strip 133 at a height H1 (see FIG. 5) are located on the substrate 131 corresponding to the minimum intensity value T1 of the interference pattern, and portions of the metal strip 133 at a height H2 are located on the substrate 131 corresponding to the maximum intensity value T2 of the interference pattern. The remaining portions of the metal strip 133 at a height H less than H1 but larger than H2 are located on the substrate 131 corresponding to the intensity values T of the interference pattern larger than T1 but less than T2. In the embodiment, the interference intensities T, T1, and T2 and heights H, H1, and H2 of each of the metal strips 133 satisfy the functions $0 \leq H2 \leq H \leq H1$ and $H=T \times (T2-T1)/(H1-H2)$.

In the embodiment, the holographic structure 13 is square shaped, and the feed antenna 11 is disposed near an apex 131a of the substrate 131. Each of the metal strips 133 has a partially elliptical ribbon structure bent toward the feed antenna 11. Each of the metal strips 133 has an inner side 133a toward the feed antenna 11 and an outer side 133b away from the feed antenna 11. The metal strips 133 includes a first metal strip, a second metal strip, . . . an i-th metal strip, . . . , and an Nth metal strip spaced from the feed antenna 11 from nearest to farthest, wherein 1≤i≤N, and N is a natural number greater than 15. Each of the metal strips 133 is symmetrical about an axis D. The axes D of all the metal strips 133 are overlapped with a diagonal line J of the holographic structure 13. An inner radius D1 (see FIG. 3B) of the i-th metal strip at the inner side 133a is 0.66×λ×(2× i−1), and an outer radius D2 (see FIG. 3B) of the i-th metal strip at the outer side 133b is 0.66×λ×2×i, wherein λ is a free-space wavelength. For example, the first metal strip has an inner radius D1 of 0.66×λ and an outer radius D2 of 1.32×λ. The inner radius D1 of the i-th metal strip is equal to half of the longest axis of an ellipse overlapping the inner side 133a of the i-th metal strip, and the outer radius D2 is equal to half of the longest axis of an ellipse overlapping the outer side 133b of the i-th metal strip.

Each of the metal strips 133 includes a plurality of metal patches 135. The metal patches 135 are sheets of square shape having a side length of 0.01λ. The metal patches 135 are spliced or overlapped to form the metal strip 133.

Figure 2:
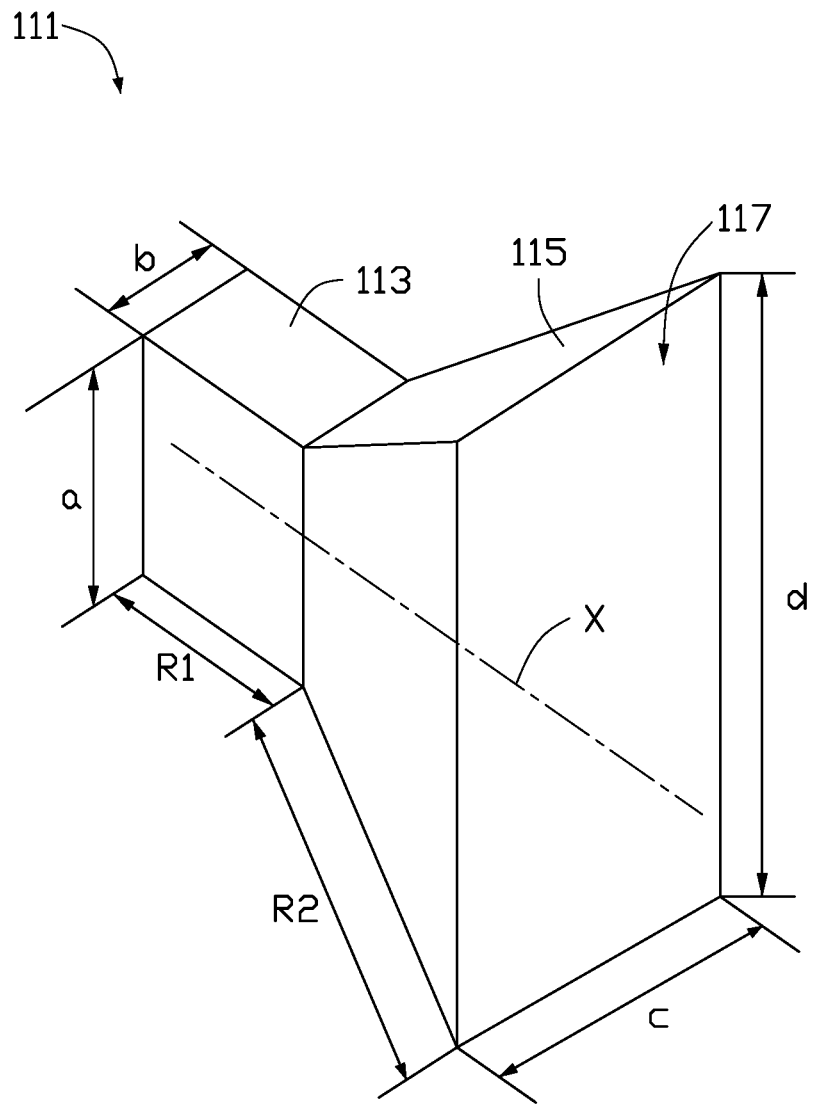
FIG. 2 is an isometric view of a feed antenna of the holographic antenna of FIG. 1.

Referring to FIG. 2, the feed antenna 11 is a pyramid horn antenna 111. The pyramid horn antenna 111 includes a waveguide 113 of rectangular shape and four inclined trapezoid side surfaces 115 connected to the waveguide 113. The side surfaces 115 are connected in order to surround the waveguide 113 and form a horn termination surface 117 at an end away from the rectangular waveguide 113.

The waveguide 113 has a length a between 1.0 cm and 1.4 cm, a width b between 0.5 cm and 0.7 cm, and a height R1 between 1.6 cm and 1.8 cm. The horn termination surface 117 has a length c between 4.2 cm and 4.4 cm, and a width d between 1.6 cm and 1.8 cm. A distance R2 between the waveguide 113 and the horn termination surface 117 is between 3.2 cm and 3.6 cm. A center axis X of the pyramid horn antenna 111 coincides with the apex 131a of the substrate 131.

Figure 3A:
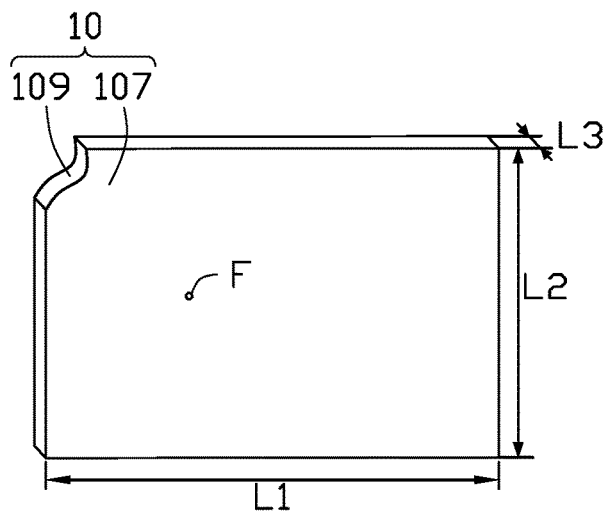
FIG. 3A to FIG. 3F show steps for fabricating the holographic antenna of FIG. 1 according to an embodiment of the present disclosure.

Referring to FIG. 3A, A base board 10 leading to from the substrate 131 includes a rectangular parallelepiped casing 107 and a filling medium 109 infilled in the casing 107. The filling medium 109 is a ceramic-filled polytetrafluoroethylene material. The base board 10 has a length L1 between 9.2 cm and 9.4 cm, a width L2 between 9.2 cm and 9.4 cm, and a thickness L3 of 0.635 cm.

Referring to FIG. 3A to FIG. 3F, a method for fabricating the holographic antenna 100 as described above includes the following steps.

In step S1, referring to FIG. 3A, a base board 10 is provided. The base board 10 includes a rectangular parallelepiped casing 107 and a filling medium 109 infilled in the casing 107. The filling medium 109 is a ceramic-filled polytetrafluoroethylene material. The base board 10 has a length L1 between 9.2 cm and 9.4 cm, a width L2 between 9.2 cm and 9.4 cm, and a thickness L3 of 0.635 cm.

Figure 3B:
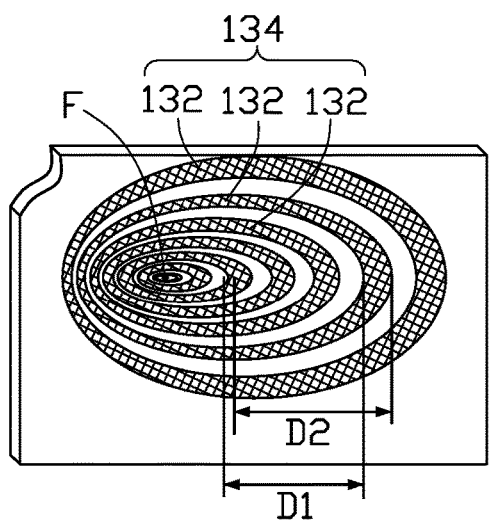

In step S2, referring to FIG. 3B, N (N being a natural number greater than 30) elliptical strip patterns 132 are drawn on the base board 10. The N elliptical strip patterns 132 have negative semi-axes overlapped with each other and a same left focal point F. The N elliptical strip patterns 132 constitute an elliptical strip group 134.

Figure 3C:
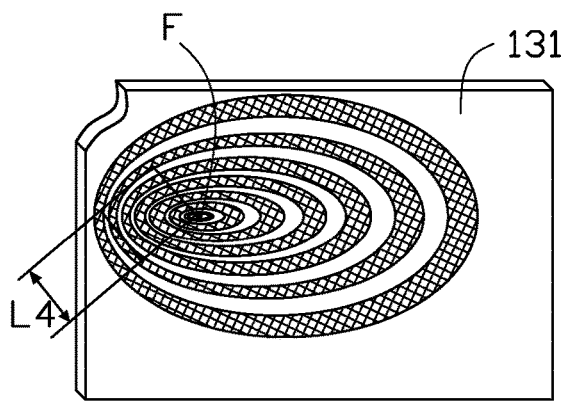

In step S3, referring to FIG. 3C, the base board 10 is cut to produce a substrate 131. An apex 131a of the substrate 131 is located on the left focal point F, an angle of the substrate 131 corresponding to the apex 131a is 90°, and a side length L4 of the substrate 131 is between 9.2 cm and 9.4 cm. A diagonal line J of the substrate 131 overlaps with the long axes of the N elliptical strip patterns 132. As a result, a surface of the substrate 131 has part of each of the elliptical strip patterns 132.

Figure 3D:
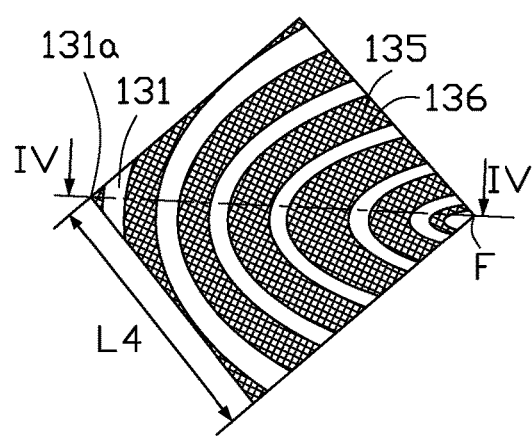
Figure 4:
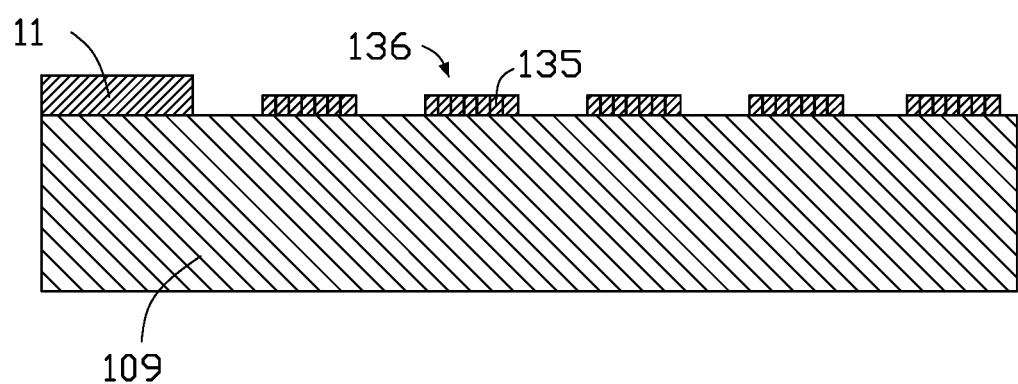
FIG. 4 is a cross-sectional view along line IV-IV of FIG. 3D.

In step S4, referring to FIG. 3D and FIG. 4, a plurality of square metal patches 135 are spliced together and attached to the substrate 131 where part of an elliptical strip pattern 132 is located to form a single-layer metal strip 136 on the part of the elliptical strip pattern 132. The single-layer metal strip 136 has a shape coinciding with a shape of the part of the elliptical strip pattern 132. Step S4 is repeated until all of the parts of the elliptical strip patterns on the substrate 131 are overlapped with a single-layer metal strip 136.

Figure 3E:
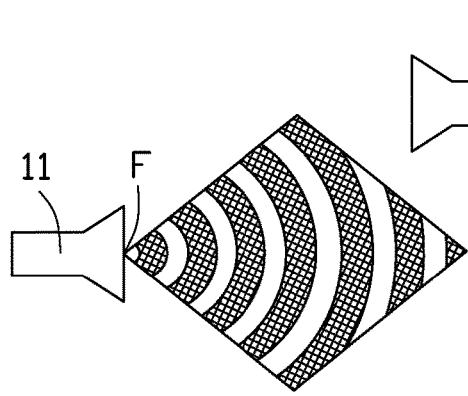

In step S5, referring to FIG. 3E, a feed antenna 11 is mounted at the apex 131a of the substrate 131 and a microwave camera 15 is mounted near the feed antenna 11. A center axis X of four inclined trapezoid side surfaces 115 of the feed antenna 11 coincides with the apex 131a of the substrate 131. The microwave camera 15 records interference intensity and information as to position.

In step S6, the feed antenna 11 is activated, and waves radiated from the feed antenna 11 interfere with waves radiated from a target antenna (not shown) on the surface of the substrate 131. Interference intensities at different positions of the surface of the substrate 131 are recorded by the microwave camera 15 and the interference intensities are calculated and converted into grayscale values of 0-255 by a computer device 16. Height values corresponding to different portions of each of the metal strips 133 are calculated according to the grayscale values by the computer device 16. Then the microwave camera 15 is removed.

Figure 3F:
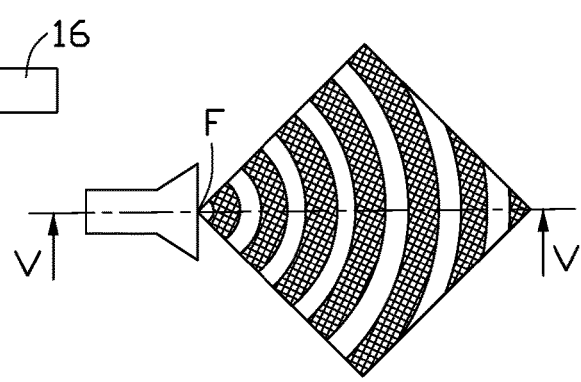
Figure 5:
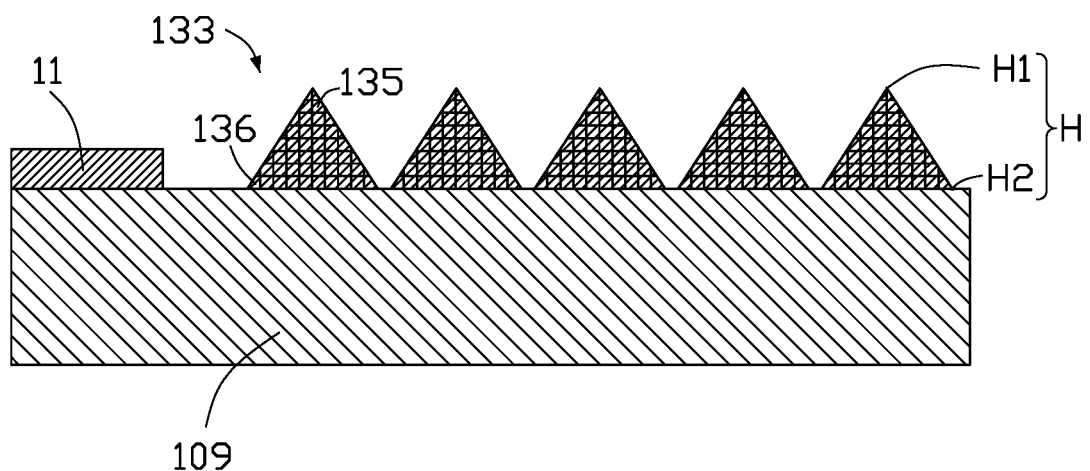
FIG. 5 is a cross-sectional view along line V-V of FIG. 3F.

In step S7, referring to FIG. 3F and FIG. 5, a plurality of square metal patches 135 are laminated on the single-layer metal strips 136 according to the height values to produce the metal strips 133, so that all portions of each metal strip 133 has height corresponding to the height values.

In the embodiment, the base board 10 has the length L1>50×λ and the width L2>40×λ.

In the embodiment, the elliptical strip group 134 includes a first elliptical strip pattern, a second elliptical strip pattern, a third elliptical strip pattern, . . . , an i-th elliptical strip pattern, . . . , and an N-th elliptical strip pattern located from nearest to farthest from the feed antenna 11. An inner radius of the i-th elliptical strip pattern is equal to 0.66×(2×i−1)×λ, and the outer radius is equal to 0.66×2×i×λ, wherein λ is a free-space wavelength.

In the embodiment, each of the metal strips 133 has a triangular cross section such that a cross section of the holographic structure 13 is close to a sine wave function structure of the actual interference field.

In the embodiment, each of the metal patches 135 is a copper sheet. The splicing of the metal patches 135 is achieved by soldering, and the laminating of the metal patches 135 is achieved by bonding or other adhesion.

The holographic structure of the present disclosure is improved from the conventional structure similar to the square wave, to be a sine wave function type structure closer to the actual interference field. Digital imaging processing technology is utilized, improving the signal quality of holographic antennas and expanding the application of holographic antennas in the future 5G communication standard.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A holographic antenna for recording an interference pattern and reconstructing waveform of a target antenna, comprising a feed antenna and a holographic structure, the holographic structure comprising a substrate and a plurality of spaced metal strips disposed on the substrate, wherein heights of portions of each of the metal strips are negatively correlated with interference intensities of the interference pattern, portions of each of the metal strips having a height H1 are located on the substrate corresponding to a minimum intensity value T1 of the interference pattern and portions of each of the metal strips having a height H2 are located on the substrate corresponding to a maximum intensity value T2 of the interference pattern, remaining portions of each of the metal strips having heights H less than H1 but larger than H2 are located on the substrate corresponding to the intensity values T of the interference pattern larger than T1 but less than T2, the interference intensity values T, T1, and T2 and heights H, H1, and H2 of each of the metal strips satisfy the functions: $0 \leq H2 \leq H \leq H1$; and $H = T \times (T2-T1)/(H1-H2)$.

2. The holographic antenna according to claim 1, wherein each of the metal strips has a partially elliptical ribbon structure bent toward the feed antenna, each of the metal strips has an inner side toward the feed antenna and an outer side away from the feed antenna, the number of the metal strips is greater than 15 and the metal strips are arranged in a radial shape toward the feed antenna, an inner radius of an i-th metal strip of the metal strips is $0.66 \times \lambda \times (2 \times i - 1)$ and an outer radius of the i-th metal strip is $0.66 \times \lambda \times 2 \times i$, wherein $1 \leq i \leq 15$, and $\lambda$ is a free space wavelength.

3. The holographic antenna according to claim 2, wherein each of the metal strips comprises a plurality of metal patches, the metal patches are sheets of square shape having a side length of $0.01\lambda$, the metal patches are spliced or overlapped to each other to form the metal strips.

4. The holographic antenna according to claim 1, wherein the feed antenna is a pyramid horn antenna comprising a waveguide of rectangular shape and four inclined trapezoid side surfaces connected to the waveguide, the side surfaces are connected in order to surround the waveguide and form a horn termination surface at an end away from the waveguide.

5. The holographic antenna according to claim 4, wherein the waveguide has a length between 1.0 cm and 1.4 cm, a width between 0.5 cm and 0.7 cm, and a height between 1.6 cm and 1.8 cm, the horn termination surface has a length between 4.2 cm and 4.4 cm, and a width between 1.6 cm and 1.8 cm, a distance between the waveguide and the horn termination surface is between 3.2 cm and 3.6 cm, a center axis of the pyramid horn antenna coincides with an apex of the substrate.

6. The holographic antenna according to claim 1, wherein the substrate comprises a parallelepiped casing and a filling medium infilled in the casing, the filling medium is a ceramic-filled polytetrafluoroethylene material.

7. A method for fabricating a holographic antenna of claim 1, comprising the steps of:
    S1: providing a base board, the base board having a length of L1, a width of L2, and a height of L3;
    S2: drawing N elliptical strip patterns on the base board, the N elliptical strip patterns having negative semi-axes overlapped with each other and a same left focal point, the N elliptical strip patterns constituting an elliptical strip group, wherein N is a natural number greater than 30;
    S3: cutting the base board to produce the substrate, wherein an apex of the substrate is located on the left focal point of the N elliptical strip patterns, an angle of the substrate corresponding to the apex is 90°, and a side length of the substrate is between 9.2 cm and 9.4 cm, a diagonal line of the substrate overlaps with the negative semi-axes of the N elliptical strip patterns, wherein part of each of the N elliptical strip patterns is on the substrate;
    S4: splicing a plurality of metal patches and attaching the metal patches to the substrate where the parts of the N elliptical strip patterns are located to form single-layer metal strips, wherein each of the single-layer metal strip has a shape coinciding with a shape of the part of a corresponding one of the elliptical strip patterns;
    S5: mounting a feed antenna at the apex of the substrate and aligning a center axis of four inclined trapezoid side surfaces of the feed antenna with the apex of the substrate, and mounting a microwave camera near the feed antenna;
    S6: starting the feed antenna to interfere with a target antenna on a surface of the substrate, recording interference intensities at different positions of the substrate by the microwave camera, converting the interference intensities into grayscale values of 0 to 255 by a computer device, and height values corresponding to portions of each of the metal strips are calculated according to the grayscale values by the computer device;
    S7: laminating a plurality of metal patches on the single-layer metal strips according to the height values to produce the metal strips, so that the portions of each of the metal strips have heights corresponding to the height values.

8. The method according to claim 7, wherein the base board comprises a rectangular parallelepiped casing and a filling medium infilled in the casing, the filling medium is a ceramic-filled polytetrafluoroethylene material.

9. The method according to claim 8, wherein the base board has the length $L1 > 50 \times \lambda$ and the width $L2 > 40 \times \lambda$, wherein $\lambda$ is a free space wavelength.

10. The method according to claim 9, wherein the length L1 of the base board is between 9.2 cm and 9.4 cm, the width L2 of the base board is between 9.2 cm and 9.4 cm, and a thickness L3 of the base board is 0.635 cm.

11. The method according to claim 7, wherein the N elliptical strip patterns are radially arranged toward the feed antenna, wherein an inner radius of an i-th elliptical strip pattern is $0.66 \times (2 \times i - 1) \times \lambda$, and an outer radius of the i-th elliptical strip pattern is $0.66 \times 2 \times i \times \lambda$, wherein $1 \leq i \leq 15$, and $\lambda$ is a free-space wavelength.

12. The method according to claim 7, wherein the metal patches are sheets of square shape having a side length of $0.01\lambda$, $\lambda$ is a free-space wavelength.

13. The method according to claim 12, wherein the metal patches are copper sheets.

14. The method according to claim 13, wherein the metal patches are spliced by soldering, and laminated by bonding or other adhesion.

* * * * *